United States Patent [19]
Monoi

[11] Patent Number: 6,153,874
[45] Date of Patent: Nov. 28, 2000

[54] SOLID IMAGING DEVICE COMPRISING ELECTRIC CHARGE TRANSFERRING FUNCTION

[75] Inventor: Makoto Monoi, Meguro-Ku, Japan

[73] Assignee: Kabushiki Kaisha Toshiba, Kawasaki, Japan

[21] Appl. No.: 09/229,586

[22] Filed: Jan. 13, 1999

[30] Foreign Application Priority Data

Jan. 14, 1998 [JP] Japan .................................. 10-005988

[51] Int. Cl.⁷ .............................. H04N 3/14; H01J 40/14
[52] U.S. Cl. ........................................ 250/208.1; 348/316
[58] Field of Search ................................ 250/208.1, 226; 348/296, 303, 304, 316, 323, 324; 257/232, 234, 241

[56] References Cited

U.S. PATENT DOCUMENTS

| | | | |
|---|---|---|---|
| 5,308,970 | 5/1994 | Pool ...................................... | 250/208.1 |
| 5,396,091 | 3/1995 | Kobayashi et al. ...................... | 348/316 |

FOREIGN PATENT DOCUMENTS

| | | |
|---|---|---|
| 54054534 | 4/1979 | Japan . |
| 05199528 | 8/1993 | Japan . |

*Primary Examiner*—Seungsook Ham
*Assistant Examiner*—Kevin Pyo
*Attorney, Agent, or Firm*—Finnegan, Henderson, Farabow, Garrett, & Dunner, L.L.P.

[57] ABSTRACT

A imaging sensor according to the present invention has pixel lines 1a, 1b and 1c arranged to three lines. At both sides of the pixel lines 1b arranged to the center, the corresponding shift electrodes 21 and 22, and corresponding CCD registers 31 and 32 are provided. At the outside of the outside pixel lines 1a and 1c, the corresponding shift electrodes 2a and 2c, and the corresponding CCD registers 3a and 3c are provided, respectively. Because the CCD registers 3a and 3c corresponding to the pixel lines 1a and 1c of both ends are arranged to the outside of the pixel lines 1a and 1c, it is possible to narrow the distance between the adjacent pixel lines. Because the signal electric charge converted from the optical signal by means of the pixel line 1b arranged to the center is distributed to two CCD registers 31 and 32, even if narrowing the width of each of the CCD registers 31 and 32, it is possible to transfer more amount of the electric charge than the conventional sensor.

24 Claims, 8 Drawing Sheets

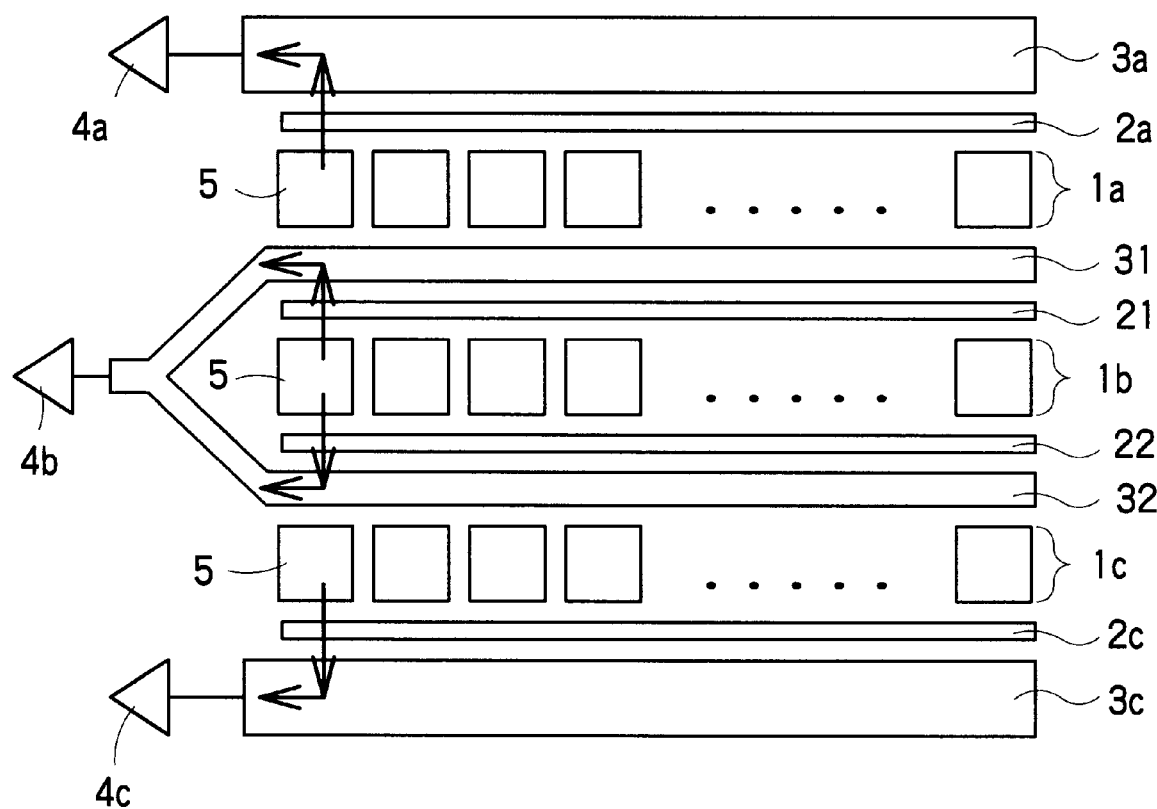
F I G. 1

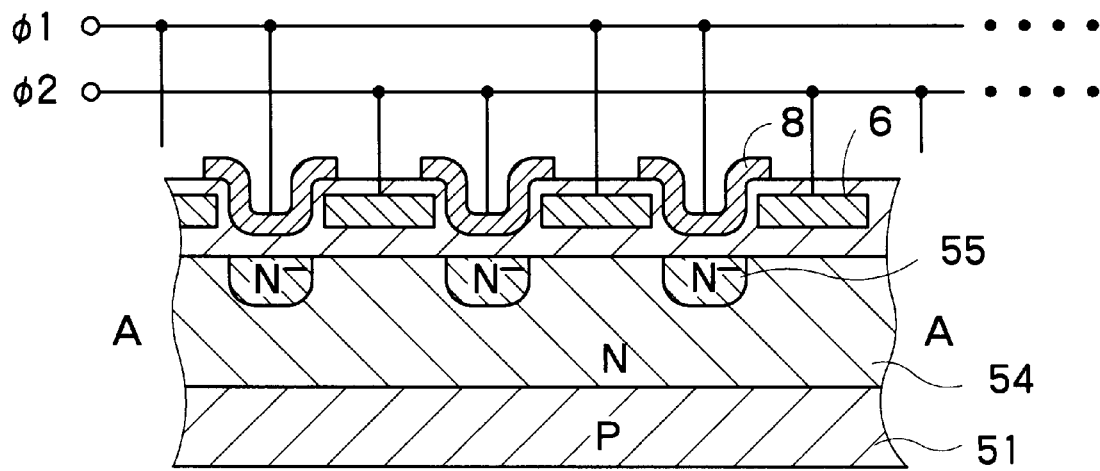
F I G. 3A
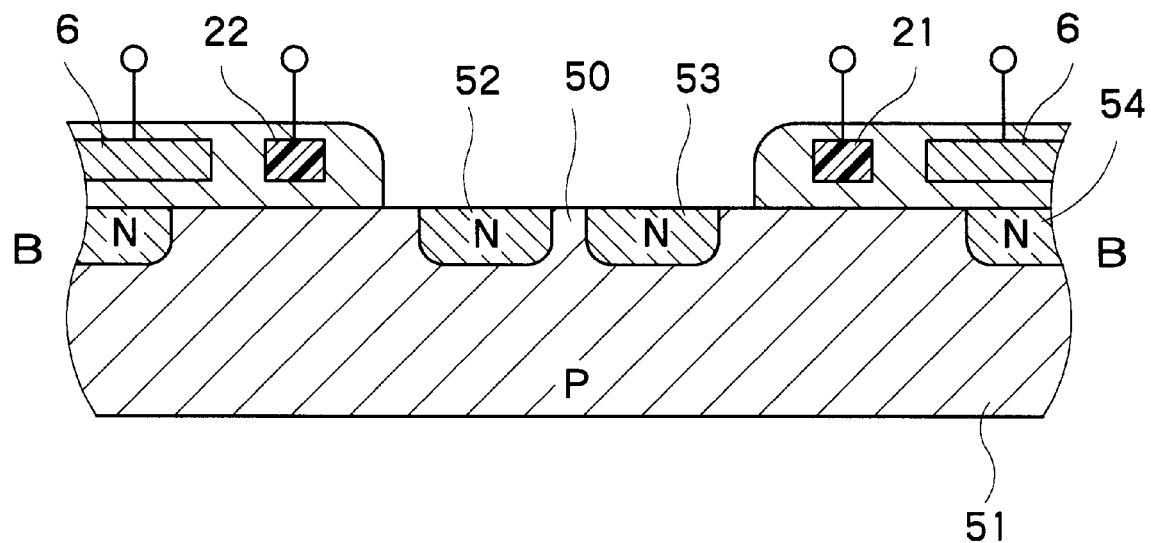
F I G. 3B

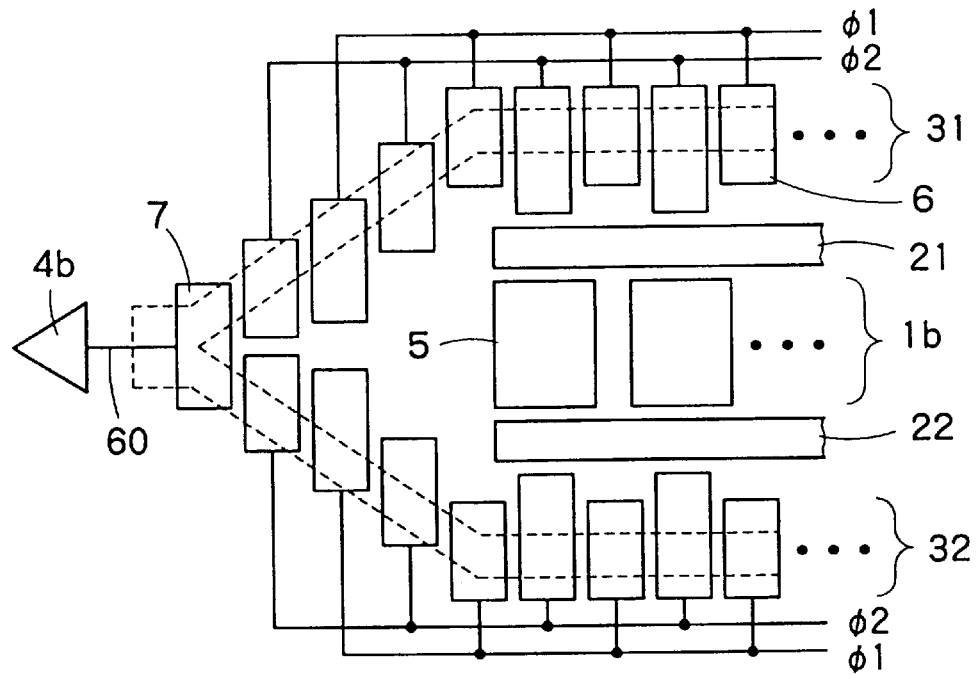
F I G. 4
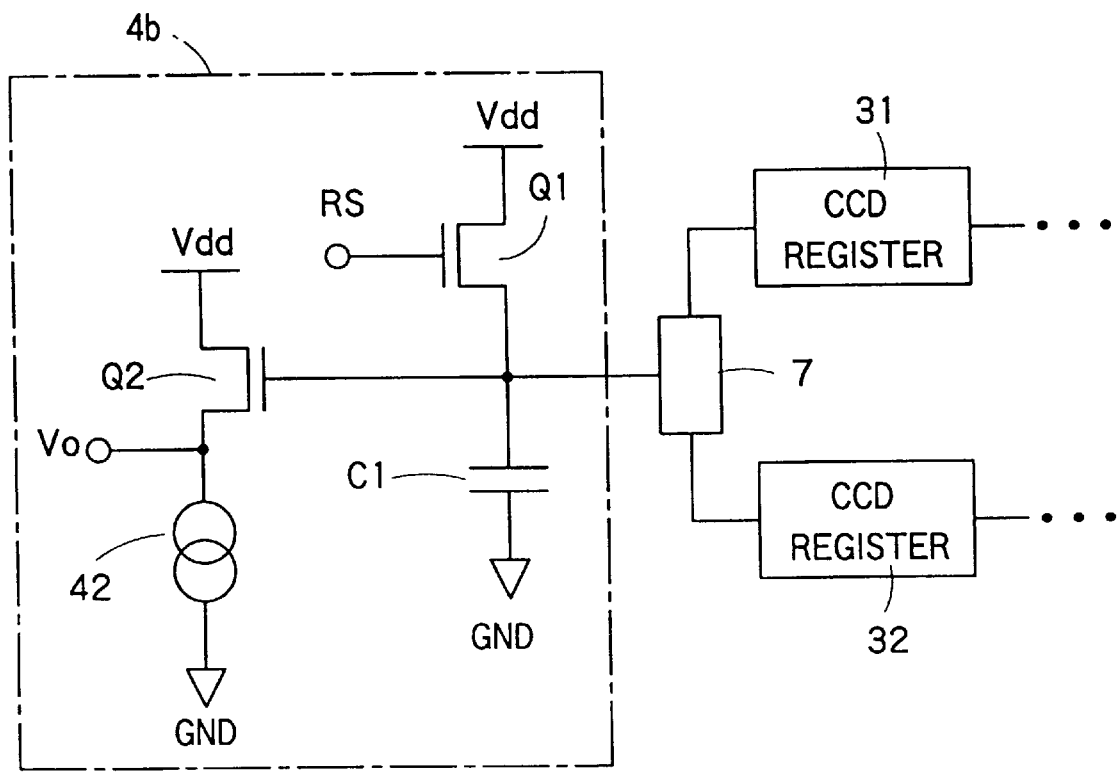
F I G. 5

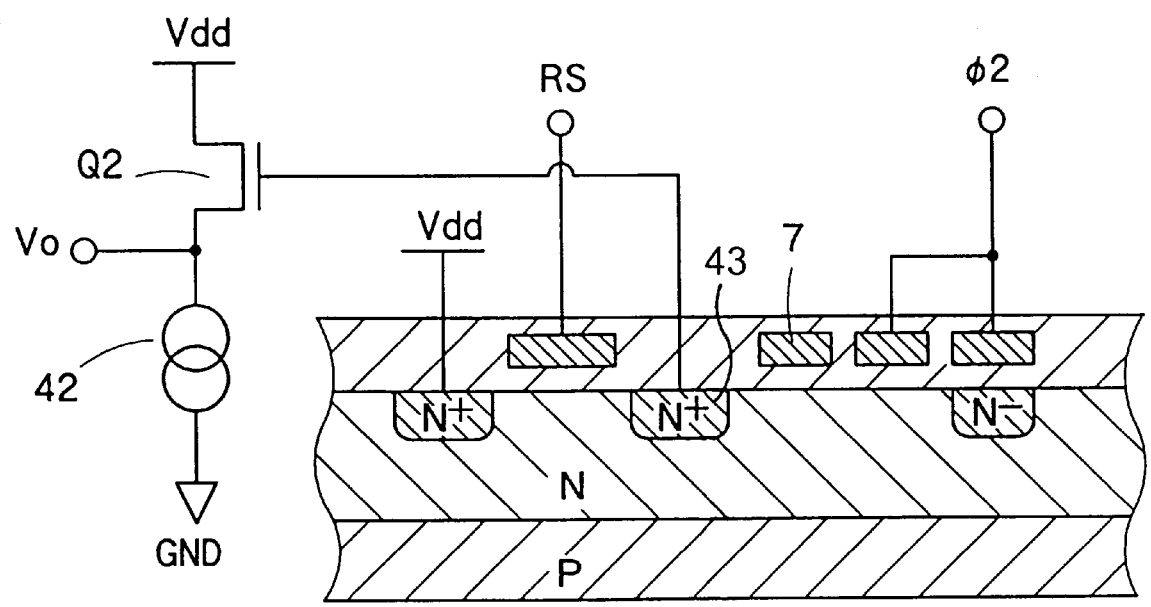
F I G. 6
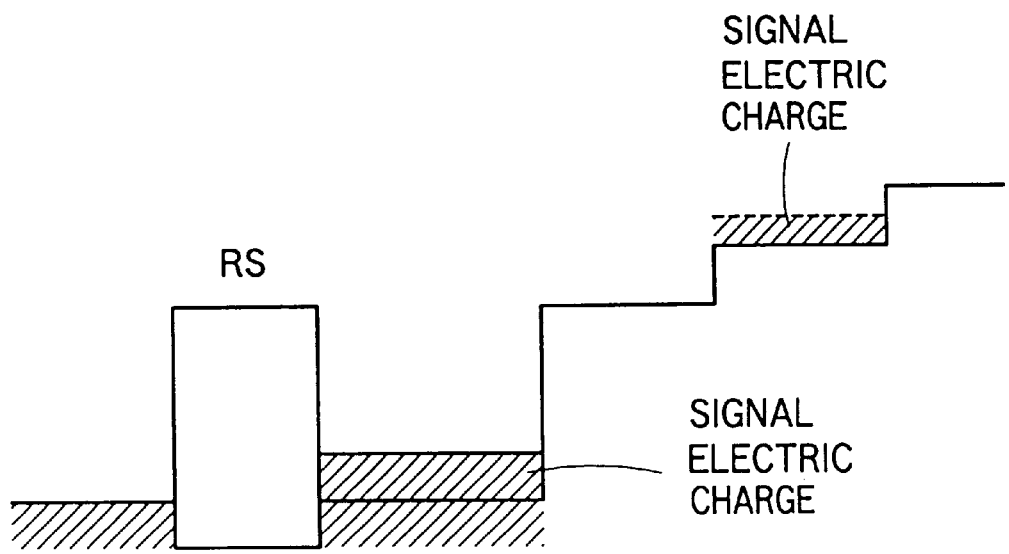
F I G. 7

SOLID IMAGING DEVICE COMPRISING ELECTRIC CHARGE TRANSFERRING FUNCTION

BACKGROUND OF THE INVENTION

1. Field of the Invention

The present invention relates to a solid imaging device having pixel lines in which photoelectric conversion sections such as photodiodes and so on is arranged linearly. Especially, the present invention relates to layout configuration of the solid imaging device.

2. Related Background Art

A CCD color linear image sensor is constituted by arranging photosensitive pixels in accordance with each color such as red, green and blue. Each of the photosensitive pixels is composed of a photoelectric conversion element such as a photodiode.

FIG. 10 is a diagram showing plain configuration of the conventional CCD color linear image sensor, FIG. 11 is an enlarged view near the end of a central pixel line 1b of FIG. 10, and FIG. 12 is an operational timing chart of the central pixel line of FIG. 10. The image sensor of FIG. 10 has image lines 1a, 1b and 1c in which a plurality of photosensitive pixels are linearly arranged. On upper surface of each of the pixel lines 1a, 1b and 1c, color filters (not shown) with red, green and blue colors are formed. During the time T1 in FIG. 13, the signal electric charge converted from the optical signal at each pixel line is transferred to the CCD registers 3a, 3b and 3c via shift electrodes 2a, 2b and 2c. And then along the direction of arrows, the signal electric charge transfers the inside of the CCD registers 3a, 3b and 3c in order. After arriving at the end of the CCD registers 3a, 3b and 3c, the signal electric charge is transferred to output circuits 4a, 4b and 4c. The output circuits 4a, 4b and 4c are provided corresponding to each of the image lines 1a, 1b and 1c. Each of the output circuits 4a, 4b and 4c outputs a color image signal OUT which is, for example, any of red, green and blue colors (RGB) signals.

As shown in FIG. 12, an image of a subject is picked up, while moving the image sensor 10 or the subject at a constant speed to the direction substantially perpendicular to the direction of the length of the pixel lines. More in detail, the color image signals are generated by conflating the result picking up the same position of the subject by means of three types of the image lines for RGB colors. Therefore, until all of the image lines picks up the same position of the subject, the data that each image line has picked up has to be stored into the memory. The further the adjacent pixel lines are spaced apart, the more the data amount being to store into the memory increases; accordingly, the memory with large capacity is necessary. Therefore, in order to reduce the cost and miniaturize the size of the image sensor, it is desirable to arrange each of the image lines as close as possible to each other.

Furthermore, if the pixel lines are spaced a long distance away from each other, distortion of resolution is prone to occur. Therefore, the optical configuration which allows the light of the subject to focus on the receiving surface of the photodiode constituting the pixel line and the mechanics which allows the image sensor to scan complicate.

Conversely, if the pixel lines are spaced only a short distance away from each other, the width of the CCD register should inevitably be narrowed. Therefore, the amount of the signal electric charge of the image sensor becomes small and the S/N ratio deteriorates.

SUMMARY OF THE INVENTION

An object of the present invention is to provide a solid imaging device being able to shorten the distance between the pixel lines and transfer the large amount of the signal electric charge.

In order to achieve the foregoing object, a solid imaging device comprising:

a pixel line constituted by a plurality of photoelectric converting sections, said photoelectric converting sections being arranged to one line; and a CCD register for transferring signal electric charge converted from an optical signal by means of each of said photoelectric converting sections to a prescribed direction in order, and an output circuit for outputting an analog signal in accordance with the signal electric charge outputted from said CCD register, wherein said CCD register has first and second electric charge transfer sections for transferring roughly the half amount of the signal electric charge converted from the optical signal by means of each of said photoelectric converting section, respectively; and after the signal electric charge of each pixel transferred from said first and second electric charge transfer sections is conflated, an analog signal in accordance with the conflated signal electric charge is outputted from said output circuit.

Furthermore, in order to achieve the foregoing object, a solid imaging device comprising:

three pixel lines constituted by a plurality of photoelectric converting sections, said photoelectric converting sections being arranged to three lines; and a plurality of CCD registers for transferring signal electric charge converted from an optical signal by means of each of said photoelectric converting sections to a prescribed direction, wherein one of said CCD registers corresponding to the central pixel line among said three pixel lines has first and second electric charge transfer sections for transferring roughly the half amount of the signal electric charge converted from the optical signal by means of the corresponding photoelectric converting section;

said first and second photoelectric transfer sections are arranged between the central pixel line and the pixel lines arranged to the both sides of said central pixel line, respectively; and each of said CCD registers corresponding to the pixel lines arranged to said both sides is arranged to the outside of the corresponding pixel line.

According to the present invention, because the signal electric charge converted from the optical signal by means of the photoelectric converting section is distributed to the first and second electric charge transfer sections, even if narrowing the width of each of the signal electric charge transfer section, it is possible to increase the amount of the signal electric charge capable of transferring.

Furthermore, if the three pixel lines are provided, because the CCD register corresponding to the outside pixel line is arranged to the outside of all the pixel lines, it is possible to narrow the distance between the adjacent pixel lines. Accordingly, it is possible to decrease the memory capacity storing the data converted from the optical signal to the electric signal and to simplify the configuration of the optical system and the scanning mechanics.

Furthermore, because the present invention has the same electric and optical properties as those of the conventional devices, the convenient and user-friendly device is obtained.

BRIEF DESCRIPTION OF THE DRAWINGS

FIG. 3A is a cross section diagram corresponding to A—A line of FIG. 2, and FIG. 3B is a cross section diagram corresponding to B—B line of FIG. 2;

FIG. 4 is a diagram showing an example that a floating diffusion layer conflates the signal electric charge;

FIG. 5 is a circuit diagram showing the detailed configuration of the output circuit in case of conflating the signal electric charge in the output circuit;

FIG. 6 is a cross sectional view showing a portion of the output circuit;

FIG. 7 is a potential diagram of the output circuit;

FIG. 10 is a diagram showing plain configuration of the conventional CCD color linear image sensor;

FIG. 11 is an enlarged view near the end of a central pixel line of FIG. 10;

FIG. 12 is a diagram showing how to pick up the image of a subject;

FIG. 13 is a diagram showing how to pick up the image of a subject.

DESCRIPTION OF THE PREFERRED EMBODIMENTS

A solid imaging device according to the present invention is described in detail with reference to the attached drawings as follows. As an example of the solid imaging device, a CCD color linear image sensor, which will be called simply "image sensor" thereafter, in which the linear pixel lines corresponding to each color of red, green and blue are arranged adjacently, will be explained.

Figure 1:
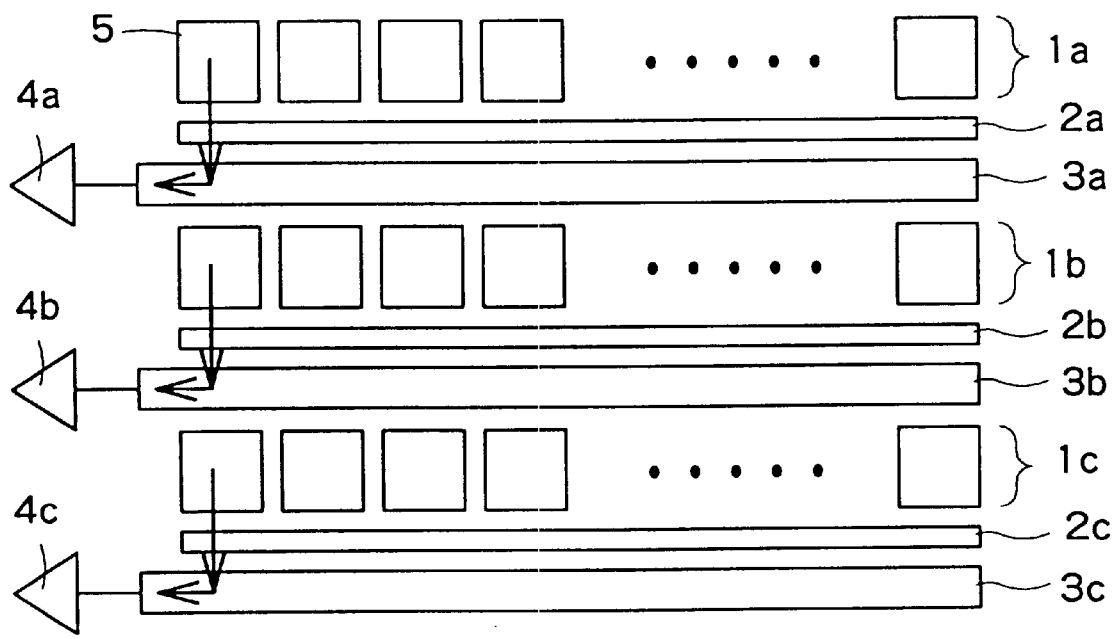
FIG. 1 is a diagram showing plain configuration of a first embodiment.
Figure 1:
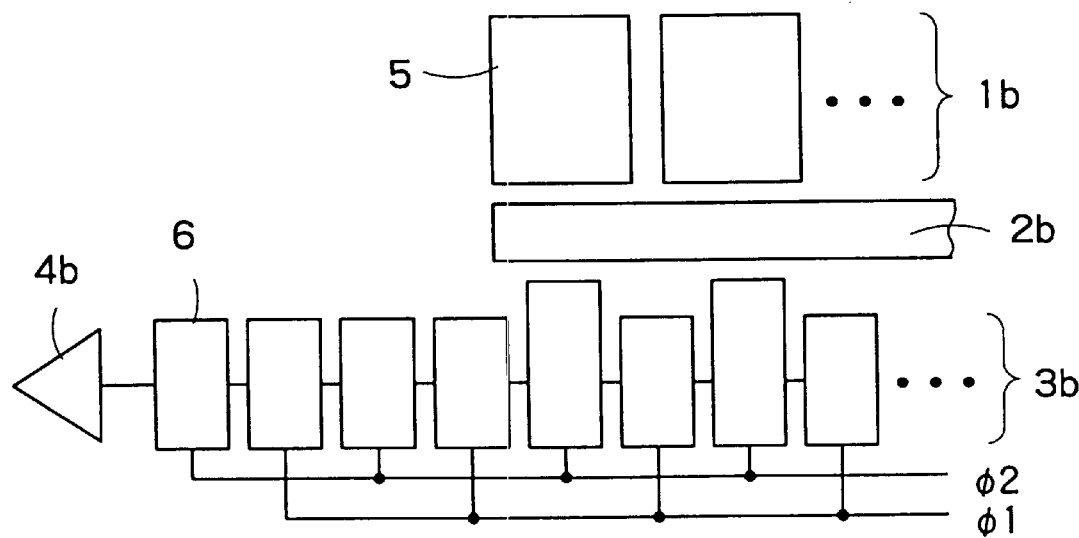
Figure 1:
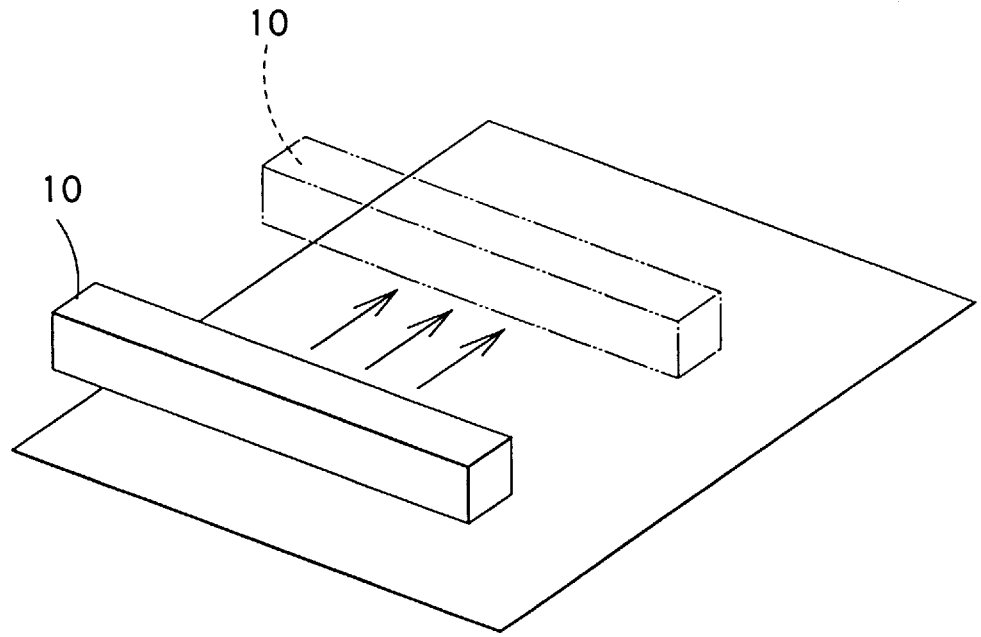
Figure 1:
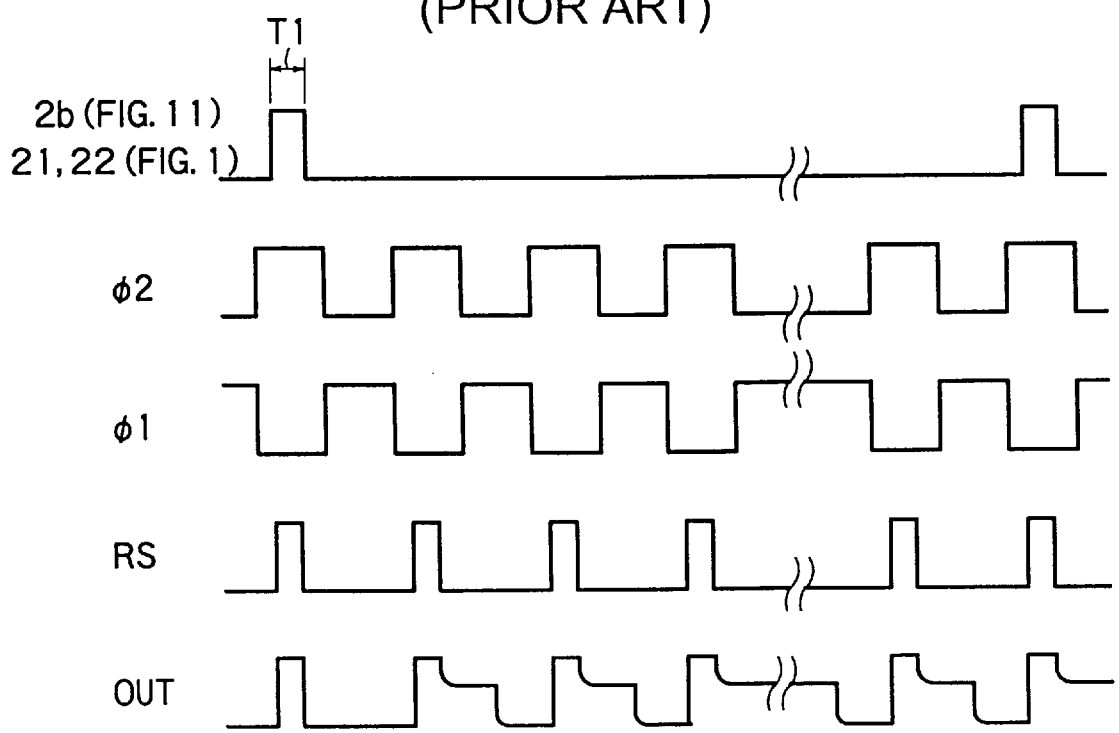

FIG. 1 is a diagram showing plain configuration of a first embodiment of the image sensor. In FIG. 1, the same symbols are attached to the same constituent as that of FIG. 10. The image sensor of FIG. 1 has the pixel lines 1a, 1b and 1c arranged to three lines in accordance with each color, like FIG. 10.

At both sides of the central pixel line 1b, the corresponding shift electrodes 21 and 22, and the corresponding CCD registers 31 and 32 (a first and second electric charge transfer sections) are provided. The CCD registers 31 and 32 combine with the CCD register 3b at the outside of the end of the pixel line 1b. The corresponding shift electrodes 2a and 2c, and the corresponding CCD resister 3a and 3c are provided at the outside of the pixel lines 1a and 1c. Output circuits 4a, 4b and 4c converting the transformed signal electric charge to the output signal are connected to the output terminals of each CCD registers 3a, 3b and 3c, respectively.

Each of the pixel lines 1a, 1b and 1c has a plurality of photodiodes 5, for example, 2000–10000 pieces of the photodiodes which are arranged to one line and each photodiode corresponds to each pixel. On the upper surface of each pixel line, a color filter (not shown) is attached.

Figure 2:
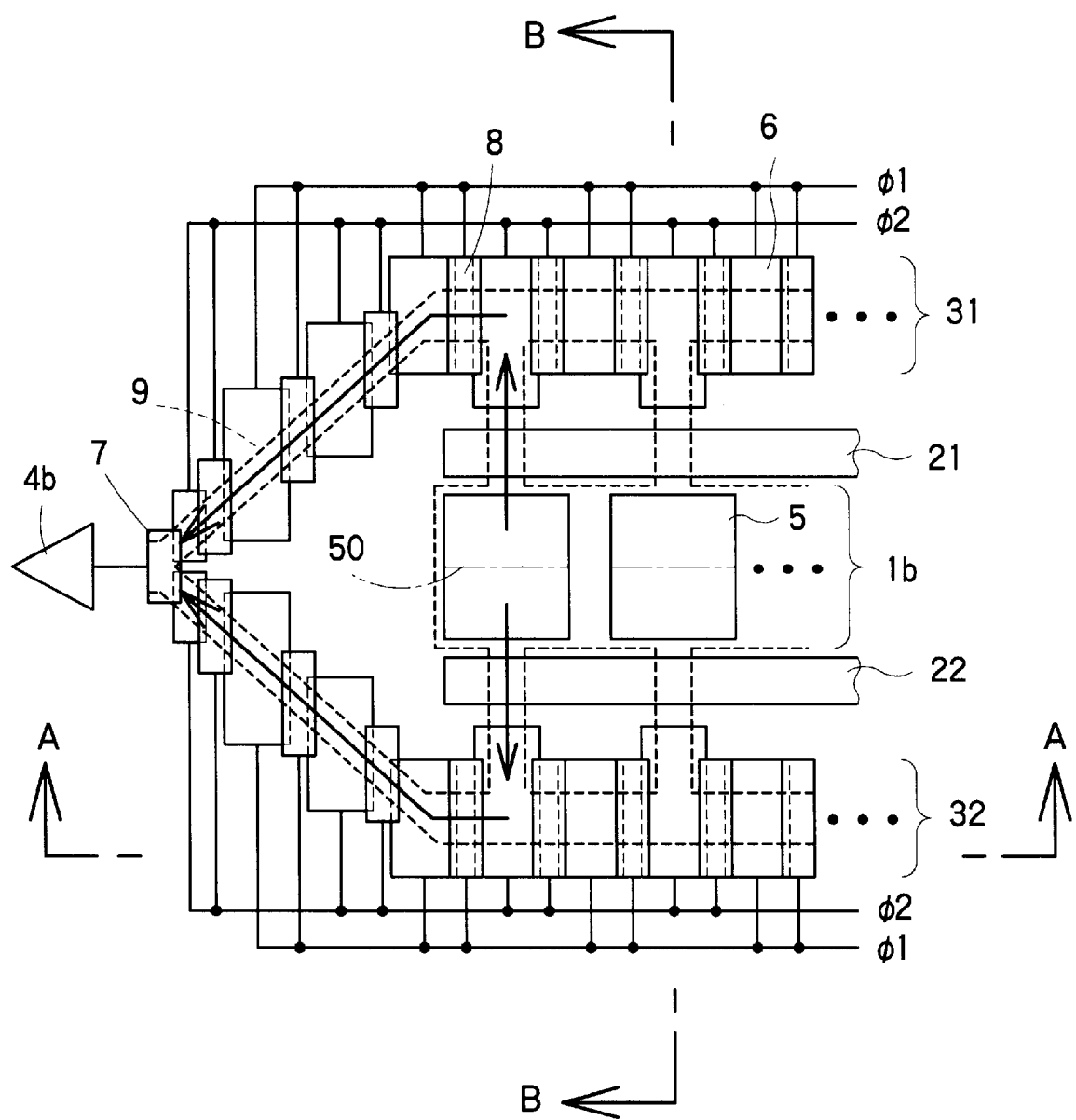
FIG. 2 is an enlarged view near the end of the pixel line 1b.

FIG. 2 is an enlarged view near the end of the pixel line 1b arranged to the center of FIG. 1. FIG. 3A is a cross section diagram corresponding to A—A line of FIG. 2, and FIG. 3B is a cross section diagram corresponding to B—B line of FIG. 2.

As shown in FIG. 2, Each of the CCD registers 3a, 31, 32 and 3c has a plurality of transfer electrodes 6 and 8 arranged to one line. For example, these electrodes 6 and 8 are driven by two-phase voltages $\Phi 1$ and $\Phi 2$. These voltages $\Phi 1$ and $\Phi 2$ are alternately applied to a pair of the adjacent transfer electrodes 6 and 8.

The CCD registers 31 and 32, the shift electrodes 21 and 22, and the pixel line 1b are arranged in roughly parallel. The closer the CCD registers 31 and 32 is to the output ends, the shorter the distance between the CCD registers 31 and 32 is. The signal electric charge transferring the inside of the CCD registers 31 and 32 in order is conflated by conflating section being an output gate 7 to which the constant voltage is applied. The conflating section is provided before the output circuit 4b. The conflated signal electric charge is inputted to an output circuit 4b.

Thus, because the first embodiment inputs the signal electric charge conflated by the conflating section to the output circuit 4b, it is unnecessary to conflate the output signal of the output circuit 4b after performing A/D conversion; accordingly, the S/N ratio is improved.

Furthermore, because the image sensor of this preferred embodiment operates with the same timing as that of the conventional image sensor, the output waveform also becomes equal; accordingly, it is possible to easily replace the conventional image sensor by the image sensor of this embodiment.

On the other hands, Japanese Patent Laid-Open No. 54(1979)-54534 discloses a line sensor which distributes the received electric charge to the CCD registers of both sides and calculates the sum of the outputs of each of the CCD registers.

However, the above mentioned document does not disclose concretely how to calculate the sum of the outputs of the CCD registers. According to only the disclosed configuration, it is impossible to add the electric charge. Usually, in case of calculating the sum of the output of a plurality of CCD registers, it is general to calculate the sum of the output of the CCD register on the condition of the digital signal after performing the A/D conversion. However, if the sum is calculated after performing the A/D conversion, the S/N ratio of the signal deteriorates.

Each photodiode 5 composing of the pixel line lb is divided into two regions having roughly an equal area by means of isolation region 50 shown by dash-single line in FIG. 2. As shown to the cross section diagram in FIG. 3B, the photodiodes 5 have two n-layers 52 and 53 formed at both sides nipping an isolation region 50 on the p-type silicon substrate 51. When the light is irradiated on neighborhood of interface between each of the n-layers 52, 53 and the p-type silicon substrate 51, pairs of an electron and a hole occur, and then the signal electric charge is accumulated in the n-layer 52 and 53. The accumulated signal electric charge is transferred to the CCD registers 31 and 32 through the downside region of the shift electrodes 21 and 22.

For example, the signal electric charge accumulated in the upper half region of the photodiode 5 shown in FIG. 2 is transferred to the upper side CCD register. On the other hand, the signal electric charge accumulated in the lower half region is transferred to the downside CCD register 32 in FIG. 2.

If the isolation region 50 shown in FIG. 2 and FIG. 3 is provided for the photodiode 5, the sensitivity does not deteriorate, because the photoelectric conversion is also performed in the isolation region 50.

Furthermore, instead of providing the isolation region 50, the n layer 52 may be combined with the n layer 53. However, if the isolation region 50 is provided for the photodiodes 5, it is possible to distribute the signal electric charge to the CCD registers at both sides of the pixel lines more surely than the photodiodes 5 including no isolation region.

As shown to the cross section diagram in FIG. 3A, the CCD registers 31 and 32 have a plurality of first electrode sections 6 arranged at constant interval and second electrode sections (not shown in FIG. 3, FIG. 4 and FIG. 9) which are arranged between each of the first electrode sections 6. The first and second electrode sections 6 and 8 are formed using the materials such as poly-silicon. For example, if the image sensor of FIG. 1 is driven by the two-phase voltages Φ1 and Φ2, as shown in FIG. 3A, the same voltage is applied to the first and second electrode sections arranged adjacently. The first and second electrode sections 6 and 8 are formed on the upper surface of the n-type well region formed on the p-type silicon substrate 51. In order to prevent the backflow of the current, the n-layer 55 with low concentration is formed immediately below the second electrode section 8.

Furthermore, at the outside of the electric transfer region (the region shown by arrows between a dotted line of FIG. 2), element isolation region, which is for example high-density p-type region, is formed. The element isolation region regulates the transfer route of the signal electric charge in the CCD registers 31 and 32. That is, the electron transferred to the CCD registers 31 and 32 from the pixel line lb is transferred to the conflating section 7 in order along the element isolation region.

Next, the operation of the image sensor of the present embodiment shown in FIGS. 1–3 will be explained. The subject light focussed on each photodiode 5 in each of the pixel lines 1a, 1b and 1c is converted from the optical signal to the signal electric charge by means of each photodiode 5. The signal electric charge converted from the optical signal is transferred to the corresponding CCD registers 3a, 31, 32 and 3c via the corresponding shift electrodes 2a, 21, 22 and 2c.

At both side of the central pixel line lb, the corresponding shift electrodes 21 and 22, and the CCD registers 31 and 32 are provided. The signal electric charge converted to the electric signal by means of each photodiode 5 in the pixel line 1b is distributed to both of the shift electrodes 21 and 22 by the roughly equal amount.

On the other hand, at the outside of the pixel lines la and Ic of the both sides, the corresponding shift electrodes 2a and 2c, and the corresponding CCD registers 3a and 3c are provided. The signal electric charge converted from the optical signal by means of the photodiode 5 in each of the pixel lines 1a and 1c is transferred to the CCD registers 3a and 3c via the corresponding shift electrodes 2a and 2c. And then the signal electric charge transfers the inside of the CCD registers 3a and 3c in order, and then is inputted to the output circuits 4a and 4c.

Thus, because the image sensor of the present embodiment arranges to both ends of the outside of the pixel lines 1a and 1c the shift electrodes 2a, 2c and the CCD registers 3a and 3c corresponding to the pixel lines 1a and 1c, it is possible to narrow the distance between the adjacent pixel lines. Accordingly, it is possible to reduce the memory capacity storing the image data and to simplify the configuration of the optical system and the scanning mechanics.

Even if the width of the CCD registers 3a and 3c is large, the distance between the pixel lines 1a and 1c does not change. Accordingly, as far as the chip size admits, it is possible to extend the width of the CCD registers 3a and 3c, and to increase the transferred amount of the electric charge.

Because the signal electric charge converted from the optical signal by means of the central pixel line 1b is distributed to the CCD registers 31 and 32 and then transferred, the transferred amount of the signal electric charge is two times larger than that of the image sensor having only one CCD register. Furthermore, even if narrowing the width of each of the CCD registers 31 and 32, it is possible to transfer the adequate amount of the electric charge.

That is, according to the present invention, it is not necessary to broaden the distance between the pixel lines, and it is possible to increase the amount of the signal electric charge capable of transferring by means of each of the CCD registers 3a, 31, 32 and 3c. Consequently, the S/N ratio improves.

In the above-mentioned embodiment, the example providing three lines of the pixel lines has been explained. However, the image sensor may have only the central pixel line 1b in FIG. 1, the corresponding shift electrodes 21 and 22, the CCD registers 31 and 32, and the output circuit 4b. Furthermore, the colors of the color filters are not especially limited, or the color filters may be abbreviated.

In the above mentioned embodiment, the example that the output gate 7 which is arranged immediately before the output circuit 4b and operates as the conflating section conflates the signal electric charge has been explained. Furthermore, the transfer electrode may be provided between the conflating section and the output circuit 4b. Furthermore, as shown in FIG. 4, instead of providing the output gate 7, a floating diffusion layer in the output circuit 4b may conflate the signal electric charge.

FIG. 5 is a circuit diagram showing the detailed configuration of the output circuit 4b in case of conflating the signal electric charge in the output circuit 4b. As shown in FIG. 5, the output circuit 4b has NMOS transistors Q1 and Q2, a capacitor C1, and a constant current source 42. The transistor Q1 and the capacitor C1 are connected in series between the power supply terminal Vdd and the ground terminal GND. Similarly, the transistor Q2 and the constant current source 42 are connected in series between the power supply terminal Vdd and the ground terminal GND. The output terminal of the output gate 7 is connected to the source terminal of the transistor Q1, one end of the capacitor C1, and the gate terminal of the transistor Q2. The ultimate output signal Vo is outputted from the source terminal of the transistor Q2.

FIG. 6 is a cross sectional view showing a portion of the output circuit 4b, and FIG. 7 is a potential diagram of the output circuit 4b. As shown in these diagrams, the signal electric charge transferring the CCD registers 31 and 32 in order is conflated at the inside of the n-type well region 54. And the conflated signal electric charge is accumulated to the floating diffusion region 43 between the transistor Q1 and the capacitor C1.

When the source follower circuit constituted by the transistor Q2 and the constant current source 42 operates, the signal electric charge accumulated in the floating diffusion layer 43 is read out as the voltage Vo at the source region of the transistor Q2.

Figure 8:
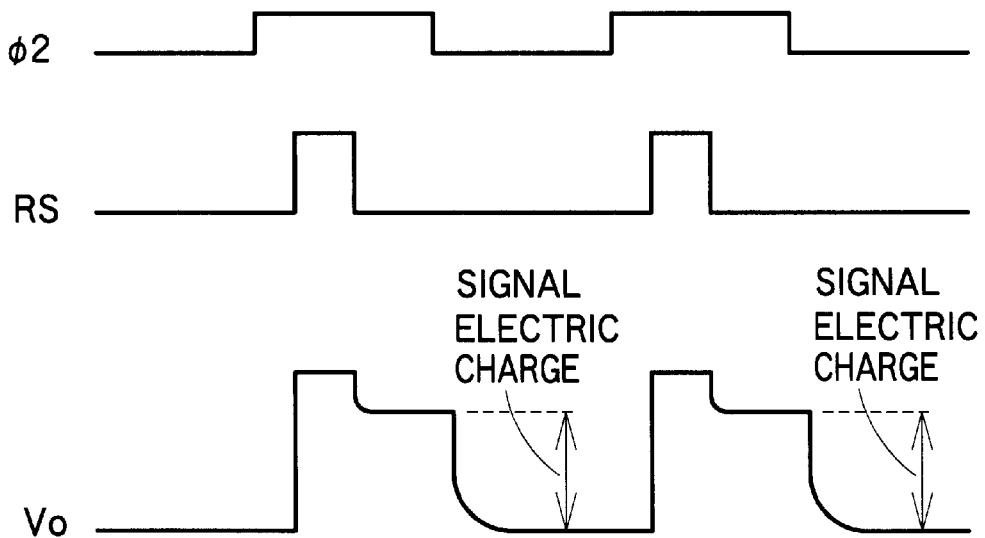
FIG. 8 is a diagram showing the relationship between the logic of an RS signal and the output voltage.

FIG. 8 is a diagram showing the relationship between the logic of an RS signal and the output voltage Vo of the output circuit 4b. As shown in FIG. 8, when the RS signal is high level, the output voltage Vo becomes a reset voltage, and the signal electric charge in the floating diffusion layer 43 is evacuated to the drain terminal of the transistor Q1. Next, after the RS signal became low level, the signal electric charge is accumulated to the floating diffusion layer 43, and the output voltage Vo becomes the voltage in accordance with the signal electric charge. Regions showing by arrows in FIG. 7 is a voltage corresponding to the signal electric charge.

Figure 9:
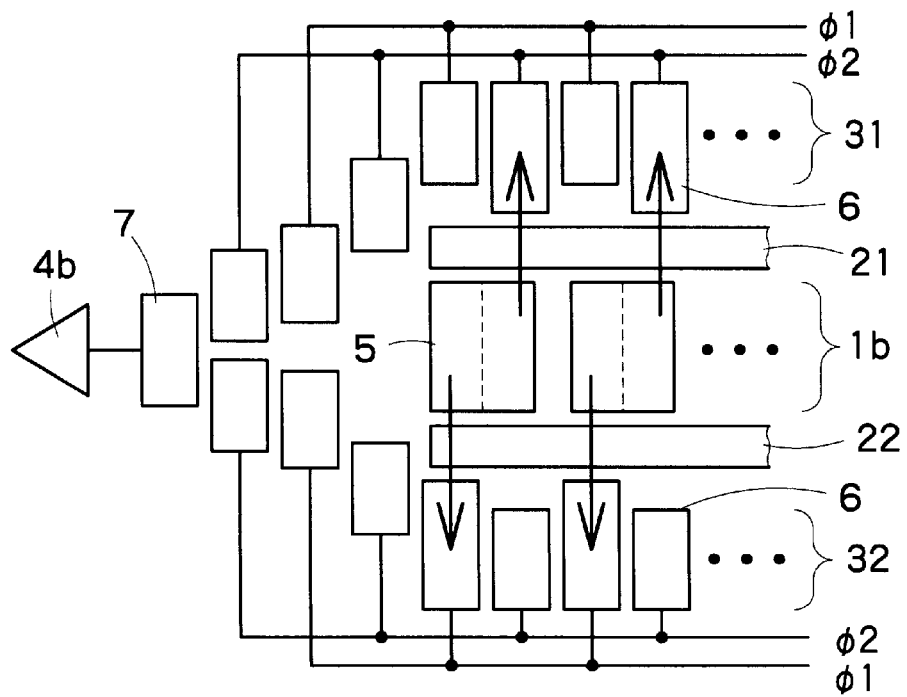
FIG. 9 is a diagram showing an example that two electric charge accumulating regions are provided along the direction the photodiodes aligns.

In the above-mentioned embodiment, as shown in FIG. 2, the example providing two electric charge accumulating region in each photodiode 5 has been explained. However, as shown in FIG. 9, along the direction the photodiodes 5 aligns, two electric charge accumulating regions may be provided.

In the above-mentioned embodiment, the example of the CCD register performing two-phase drive has been explained. However, the CCD register which is driven by more than three-phase may be used.

What is claimed is:

1. A solid imaging device comprising:

a pixel line constituted by a plurality of photoelectric converting sections, said photoelectric converting sections being arranged to one line;

a CCD register for transferring signal electric charge converted a prescribed direction in order, and an output circuit for outputting an analog signal in accordance with the signal electric charge outputted from said CCD register, said CCD register having first and second electric charge transfer sections, each of the first and second electric transfer sections transferring roughly the half amount of the signal electric charge converted at each of said photoelectric converting section in said pixel line, respectively; and said solid imaging device further comprising:

a first shift electrode for transferring signal electric charge converted at each of said photoelectric converting section to said first electric charge transfer section in the direction substantially orthogonal to the direction of said pixel line, and a second shift electrode for transferring signal electric charge converted at each of said photoelectric converting section to said second electric charge transfer section in the direction substantially orthogonal to the direction of said pixel line, wherein after the signal electric charge transferred from said first and second electric charge transfer sections is conflated, an analog signal in accordance with the conflated signal electric charge is outputted from said output circuit.

2. The solid imaging device according to claim 1, wherein a conflating section for conflating the signal electric charge transferred from said first and second electric charge transfer sections is provided, said conflating section being arranged so as to connect the output ends of said first and second electric charge transfer sections to the output circuit, and the output of said conflating section being inputted to said output circuit.

3. The solid imaging device according to claim 1, wherein the signal electric charge transferred from said first and second electric charge transfer sections is conflated in said output circuit.

4. The solid imaging device according to claim 1, wherein said output circuit includes a floating region, the voltage of said floating region changing in accordance with the amount of the signal electric charge of each pixel transferred from said first and second electric charge transfer sections, and a reset gate for setting said floating region to a prescribed voltage.

5. The solid imaging device according to claim 4, wherein said output circuit further includes a source follower circuit constituted by a MOS transistor and a constant current source connected in series between a power supply terminal and a ground terminal, a gate terminal of said MOS transistor being connected to said floating region, and a source terminal of said MOS transistor being an output node.

6. The solid imaging device according to claim 1, wherein each of said photoelectric converting section in said pixel line has first and second electric charge accumulating sections arranged via an isolation region to the direction substantially perpendicular to the direction that said photoelectric converting section aligns in said pixel line;

said first and second electric charge accumulating sections can accumulate roughly the half amount of the signal electric charge converted from the optical signal by means of the corresponding photoelectric converting section;

the signal electric charge accumulated to said first electric charge accumulating section is transferred to said first electric charge transfer section; and the signal electric charge accumulated to said second electric charge accumulating section is transferred to said second electric charge transfer section.

7. The solid imaging device according to claim 1, wherein each of said photoelectric converting section in said pixel line has first and second electric charge accumulating sections arranged via an isolation region to the direction along the direction that said photoelectric converting section aligns in said pixel line;

said first and second electric charge accumulating sections can accumulate roughly the half amount of the signal electric charge converted from the optical signal by means of the corresponding photoelectric converting section;

the signal electric charge accumulated to said first electric charge accumulating section is transferred to said first electric charge transfer section; and the signal electric charge accumulated to said second electric charge accumulating section is transferred to said second electric charge transfer section.

8. The solid imaging device according to claim 1, further comprising:

an element isolation region formed along a route transferring the signal electric charge in said CCD register.

9. The solid imaging device according to claim 1, wherein said CCD register has a plurality pairs of first and second transfer electrodes arranged by turns along said pixel lines; and said CCD register applies a first voltage to either pair of two adjacent pairs of said first and second transfer electrodes, and a second voltage to another pair, in order to transfer the signal electric charge.

10. The solid imaging device according to claim 1, further comprising:

a shift electrode for transferring to said CCD register the signal electric charge converted from the optical signal by means of each of said photoelectric converting sections in said pixel line, said shift electrode being formed between said pixel line and said CCD register, and being provided in correspondence with each of said photoelectric converting sections in said pixel line.

11. A solid imaging device comprising:

three pixel lines constituted by a plurality of photoelectric converting sections, said photoelectric converting sections being arranged to three lines; and a plurality of CCD registers for transferring signal electric charge converted from an optical signal by means of said photoelectric converting sections to a prescribed direction, wherein one of said CCD registers corresponding to the central pixel line among said three pixel lines has first and second electric charge transfer sections for transferring roughly the half amount of the signal electric charge converted at the corresponding photoelectric converting section in the pixel line;

said first and second photoelectric transfer sections are arranged between the central pixel line and the pixel lines arranged to both sides of said central pixel line, respectively; and each of said CCD registers corresponding to the pixel lines arranged to said both sides is arranged only to the outside of the corresponding pixel line.

12. A solid imaging device according to claim 11, wherein said CCD register corresponding to said central pixel line has a conflating section for conflating the signal electric charge transferred from said first and second electric transferring sections.

13. A solid imaging device according to claim 11, further comprising:

an output circuit including a floating region, the voltage of said floating region changing in accordance with the amount of the signal electric charge of each pixel transferred from said first and second electric charge transfer sections, and a reset gate for setting said floating region to a prescribed voltage.

14. The solid imaging device according to claim 13, wherein said signal electric charge corresponding to each pixel transferred from said first and second electric charge transfer sections is conflated in said output circuit, and the conflated signal electric charge is accumulated to said floating region.

15. The solid imaging device according to claim 13, wherein said output circuit further includes a source follower circuit constituted by a MOS transistor and a constant current source connected in series between a power supply terminal and a ground terminal, a gate terminal of said MOS transistor being connected to said floating region, and a source terminal of said MOS transistor being an output node.

16. The solid imaging device according to claim 11, wherein each of said photoelectric converting section in said central pixel line has first and second electric charge accumulating sections arranged via an isolation region to the direction substantially perpendicular to the direction that said photoelectric converting section aligns in said central pixel line;

said first and second electric charge accumulating sections can accumulate roughly the half amount of the signal electric charge converted from the optical signal by means of the corresponding photoelectric converting section;

the signal electric charge accumulated to said first electric charge accumulating section is transferred to said first electric charge transfer section; and the signal electric charge accumulated to said second electric charge accumulating section is transferred to said second electric charge transfer section.

17. The solid imaging device according to claim 11, wherein each of said photoelectric converting section in said central pixel line has first and second electric charge accumulating section arranged via an isolation region to the direction along the direction that said photoelectric converting sections align in said central pixel line;

said first and second electric charge accumulating sections can accumulate roughly the half amount of the signal electric charge converted from the optical signal by means of the corresponding photoelectric converting section;

the signal electric charge accumulated to said first electric charge accumulating section is transferred to said first electric charge transfer section; and the signal electric charge accumulated to said second electric charge accumulating section is transferred to said second electric charge transfer section.

18. The solid imaging device according to claim 11, further comprising:

an element isolation region formed along routes transferring the signal electric charge in said CCD registers.

19. The solid imaging device according to claim 11, wherein each of said CCD registers has a plurality pairs of first and second transfer electrodes arranged by turns along the corresponding pixel line; and each of said CCD registers applies a first voltage to either pair of two adjacent pairs of said first and second transfer electrodes, and a second voltage to another pair, in order to transfer the signal electric charge.

20. The solid imaging device according to claim 11, further comprising:

shift electrodes for transferring the signal electric charge converted from the optical signal by means of each photoelectric converting sections in each of said three pixel lines to the corresponding CCD register, said shift electrodes being formed between each of three pixel lines and the corresponding CCD register, and being provided in correspondence with each of said photoelectric converting sections in said three pixel lines.

21. A solid imaging device comprising:

three pixel lines constituted by a plurality of photoelectric converting sections, said photoelectric converting sections being arranged to three lines, and a plurality of CCD registers for transferring signal electric charge converted from an optical signal by means of each of said photoelectric converting sections to a prescribed direction, wherein one of said CCD registers corresponding to the central pixel line among said three pixel lines has first and second electric charge transfer sections for transferring roughly the half amount of the signal electric charge converted from the optical signal by means of the corresponding photoelectric converting section;

said first and second photoelectric transfer sections are arranged between the central pixel line and the pixel lines arranged to the both sides of said central pixel line, respectively;

each of said CCD registers corresponding to the pixel lines arranged to said both sides is arranged only to the outside of the corresponding pixel line, and said first and second electric charge transfer sections have width narrower than that of said CCD registers in accordance with the pixel lines arranged to the both sides.

22. The solid imaging device according to claim 1, wherein said photoelectric converting sections are arranged at least one in the direction substantially orthogonal to the direction that said pixel lines align, and transfer the signal electric charge to said first and second electric charge transfer sections in substantially equal amounts.

23. The sold imaging device according to claim 11, wherein said photoelectric converting sections are arranged at least one in the direction substantially orthogonal to the direction that said pixel lines align, and transfer the signal electric charge to said first and second electric charge transfer sections in substantially equal amounts.

24. The solid imaging device according to claim 21, wherein said photoelectric converting sections are arranged at least one in the direction substantially orthogonal to the direction that said pixel lines align, and transfer the signal electric charge to said first and second electric charge transfer sections in substantially equal amounts.

* * * * *

UNITED STATES PATENT AND TRADEMARK OFFICE
CERTIFICATE OF CORRECTION

PATENT NO. : 6,153,874
DATED : November 28, 2000
INVENTOR(S) : Makoto Monoi

It is certified that error appears in the above-identified patent and that said Letters Patent is hereby corrected as shown below:

On the Title Page:

Item [57], in the Abstract, line 1, "A imaging" should read --An imaging--.

Column 7, line 28, after "converted" insert --at each of said photoelectric converting sections in said pixel line to--

Signed and Sealed this

Twenty-second Day of May, 2001

Attest:

NICHOLAS P. GODICI

Attesting Officer

Acting Director of the United States Patent and Trademark Office